US012564903B2

(12) United States Patent
Eckl et al.

(10) Patent No.: US 12,564,903 B2
(45) Date of Patent: Mar. 3, 2026

(54) METHOD AND DEVICE FOR CUTTING A METAL-CONTAINING FOIL, AND LASER-CUT METAL-CONTAINING FOIL

(71) Applicant: FRAUNHOFER-GESELLSCHAFT ZUR FÖRDERUNG DER ANGEWANDTEN FORSCHUNG E.V., Munich (DE)

(72) Inventors: Maximilian Josef Eckl, Dresden (DE); Gerrit Mäder, Dresden (DE); Julius Roch, Dresden (DE); Philipp Thümmler, Dresden (DE); Thomas Abendroth, Dresden (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 83 days.

(21) Appl. No.: 18/551,774

(22) PCT Filed: Mar. 24, 2022

(86) PCT No.: PCT/EP2022/057804
§ 371 (c)(1),
(2) Date: Sep. 21, 2023

(87) PCT Pub. No.: WO2022/200516
PCT Pub. Date: Sep. 29, 2022

(65) Prior Publication Data
US 2024/0173803 A1 May 30, 2024

(30) Foreign Application Priority Data
Mar. 25, 2021 (DE) ..................... 10 2021 202 964.7

(51) Int. Cl.
| | |
|---|---|
| *B23K 26/38* | (2014.01) |
| *B23K 26/0622* | (2014.01) |
| *B23K 26/08* | (2014.01) |

(52) U.S. Cl.
CPC .......... *B23K 26/38* (2013.01); *B23K 26/0622* (2015.10); *B23K 26/08* (2013.01)

(58) Field of Classification Search
CPC ............................ B23K 26/38; B23K 26/0622
See application file for complete search history.

(56) References Cited

U.S. PATENT DOCUMENTS 10,919,112 B2    2/2021 Dai et al.
2019/0093185 A1*    3/2019 Weissert .............. B23K 26/364
(Continued)

FOREIGN PATENT DOCUMENTS

DE    10 2009 049 762 B3    1/2011
DE    10 2019 110 375 A1    10/2019
(Continued)

OTHER PUBLICATIONS

Jansen et al., "Processing of Advanced Battery Materials—Laser Cutting of Pure Lithium Metal Foils," *Batteries* 4(3) 37 (2018)—16 pgs. plus cover.
(Continued)

*Primary Examiner* — Woody A Lee, Jr.
(74) *Attorney, Agent, or Firm* — Leydig, Voit & Mayer, Ltd.

(57) ABSTRACT

Disclosed are a method and a device for cutting a foil which contains at least one layer of metal. The laser for cutting the foil is controlled such that pulsed laser radiation cuts through at least one layer of metal of the foil such that the metal of the foil is mostly sublimated and scarcely melts. The resulting laser-cut foil does not have, or has very small sized, bead structures and/or metal splashes of solidified metal. When the foil is used in a battery, the electric performance and durability of the battery are greater and the risk of a short circuit is lower.

15 Claims, 1 Drawing Sheet

(56)                   References Cited

U.S. PATENT DOCUMENTS

| | | | |
|---|---|---|---|
| 2019/0329353 A1* | 10/2019 | Dai | ................... B23K 37/0408 |
| 2021/0021845 A1 | 1/2021 | Park et al. | |
| 2021/0107092 A1* | 4/2021 | Schmit | ...................... C23C 2/12 |
| 2021/0139321 A1* | 5/2021 | Patil | ................... B23K 26/0006 |
| 2021/0197321 A1* | 7/2021 | Mansuino | ............. B23K 26/38 |

FOREIGN PATENT DOCUMENTS

| | | | | |
|---|---|---|---|---|
| DE | 10 2019 213 417 A1 | 3/2021 | | |
| DE | 112022002025 T5 | * 2/2024 | ............ | B23K 26/53 |
| EP | 2 953 184 A1 | 12/2015 | | |
| GB | 2 572 608 A | 10/2019 | | |
| KR | 10 2008 0 101 725 A | 11/2008 | | |
| WO | WO 2019/076592 A1 | 4/2019 | | |

OTHER PUBLICATIONS

German Patent Office, Examination Report in German Patent Application No. 10 2021 202 964.7 (Nov. 2, 2021).
European Patent Office, International Search Report in International Application No. PCT/EP2022/057804 (Oct. 25, 2022).
European Patent Office, Written Opinion in International Application No. PCT/EP2022/057804 (Oct. 25, 2022).
International Bureau of WIPO, International Preliminary Report on Patentability in International Application No. PCT/EP2022/057804 (Sep. 12, 2023).

* cited by examiner

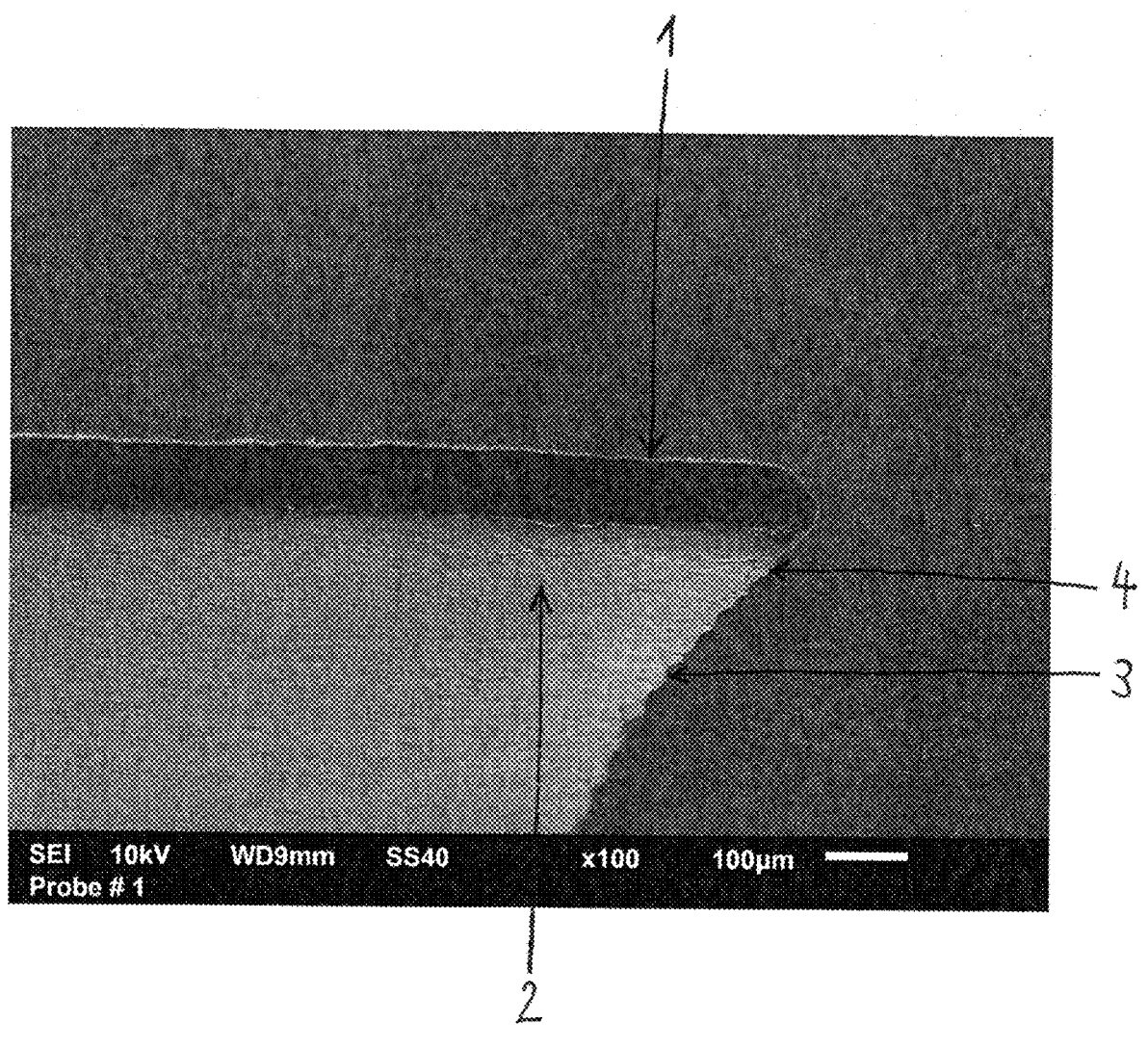

METHOD AND DEVICE FOR CUTTING A METAL-CONTAINING FOIL, AND LASER-CUT METAL-CONTAINING FOIL

CROSS-REFERENCE TO RELATED APPLICATIONS

This patent application is the U.S. national phase of International Application No. PCT/EP2022/057804, filed on Mar. 24, 2022, which claims the benefit of German Patent Application No. 10 2021 202 964.7, filed Mar. 25, 2021.

A method and a device are provided for cutting a foil, which comprises or consists of at least one metal layer (in particular: lithium). The method and the device are characterized in that a laser for cutting the foil and/or a foil positioning means are controlled such that pulsed laser radiation, which is emitted by the laser towards a foil positioned by the foil positioning means, cuts through the at least one layer of metal of the foil such that the metal of the foil is mainly sublimated and hardly melts. By way of the method and the device, it is possible to provide a laser-cut foil, which has no or only very small bead structures and/or metal spatters of solidified metal in the cutting area. If the foil is used as a battery component, its electrical performance and long-term stability are greater and the risk of short circuits in the battery cell is lower.

The production of electrodes from lithium foil (e.g. with a thickness of 20 to 250 μm) presents some processing challenges due to the high ductility of lithium, the low melting temperature of lithium of 180.5° C., and the high reactivity of the lithium with other elements.

The prior art includes the punching (flat-bed punching, rotary punching, etc.) of thin lithium metal foils. However, the processing of this highly ductile material is problematic, as generally the punching tool sticks to the foil, which results in long downtimes and requires a lot of work to clean the punching tool. In addition, the stuck-on foil is no longer usable in most cases which means a large number of rejects. Therefore, the punching of lithium foils cannot be performed very economically, particularly on an industrial scale.

It is known from the prior art to cut metal foils using a laser instead of punching. Laser cutting is a non-contact cutting process which can avoid the problems of metal foil sticking to a punching tool. Laser cutting is used for example in electrode assembly. For metal foils, with or without active material coating of any thickness, it is possible to resort to different laser sources and forms of beam application. In particular, an ultrashort pulse laser (USP) and a YAG laser are widely used for electrode assembly, the YAG laser being a "continuous wave" laser (abbreviated to CW laser) with multiple wavelengths with high beam divergence (known as the MM method) or with a single wavelength with a low beam divergence (known as the SM method).

WO 2019/076592 A1 discloses the use of a high-power CW laser for assembling cathode foils, i.e. metal substrate foils with various cathodic coatings. The cut through the various cathodic coatings is performed here by a multiple cut, i.e. the cathodic coatings are cut by multiple, time-staggered passes of the laser beam over the cutting area. However, the metal substrate foil (e.g. made of aluminum, nickel or steel) is only cut by a single cut, i.e. in a single pass of the laser beam over the cutting area. In the case of a foil which comprises or consists of a metal with a low melting point (such as e.g. lithium), this procedure would cause local melting of the lithium in the region of the cutting edge and the formation a bead structures and spatter structures of lithium in this area.

DE 10 2019 110375 A1 discloses laser cutting and laser welding of lithium metal foils. Here, a USP laser with variable power density is used in the laser spot (diameter of the laser spot: 10 to 200 μm). The pulse duration is here in the range of 0.5 nanoseconds to 0.5 microseconds and the pulse frequency is in the range of 1 to 100 kHz, wherein the travel speed of the laser relative to the metal foil is in the range of 0.1 to 2 m/s.

Jansen, T. et al. (Batteries, 2018, Vol. 4, Issue 37, p. 1-16) have found however that it is not possible to perform a laser cut through a lithium foil with a USP laser without defects being formed in the form of bead structures and/or spatters of solidified lithium metal. Such bead strictures and spatters are particularly detrimental to the use of the cut lithium foils for producing batteries, as they can cause locally critical current spikes during the operation of the battery, which can encourage side reactions and dendrite formation. This can shorten the battery life. Furthermore, these structures can increase the risk of a short-circuit (for example caused by these structures passing through the separator). The short circuit may then cause the thermal runaway of the battery, which not only destroys the battery but is also dangerous for the user (risk of burning and explosion).

DE 10 2009 049 762 B3 discloses a method in which a foil comprising aluminum is cut with a CW laser having a power density of at least $10^7$ W/mm$^2$. The resulting cutting edge is almost perpendicular to the surface and has no transitions to other layers of the foil (e.g. a layer of ceramic and a layer of iron phosphate). In this case, the laser has thus only sublimated the aluminum metal of the foil but has not melted it. However, by way of this method it is not possible to cut a metal which has a melting point of at most 200° C. (such as e.g. lithium metal) without creating molten metal. If this method is used to cut such a metal, these metals will melt at the cutting edge and defects will form in the form of bead structures and/or splatters of solidified metal. The formation of such defective structures is detrimental to a use of the cut foil in batteries.

In the prior art there is a need to cut metal foils with a laser, even those metal foils which comprise or consist of a metal with a low-melting point (such as e.g. lithium), without defective structures being formed in the region of the cutting edge which are detrimental to a use of the foil in batteries.

On this basis, the objective of the invention was to provide a method and a device for cutting a foil which comprises or consists of a metal with a low melting point which does not have the disadvantages known from the prior art. In particular, it should be possible by way of the method and the device to cut such a foil so that no structures are formed, or only very small structures are formed, in the region of the cutting edge (e.g. metal beads and metal splatters) so that there are no disadvantages in using the foil as a battery component. Furthermore, a foil comprising or consisting of a metal with a low melting point is to be provided, in which the region around the cutting edges has no or only very small bead structures and metal spatters.

The objective is achieved by the method described herein, as well as by the device and the foil described herein, and the advantageous embodiments thereof.

According to the invention, a method is provided for cutting a foil which comprises or consists of at least one layer which comprises or consists of a metal comprising the steps of:

a) providing a foil positioning means;

b) positioning a foil which comprises or consists of at least one layer which comprises or consists of a metal (e.g. a foil consisting of lithium) by the foil positioning means;

c) providing a laser suitable for emitting pulsed laser radiation towards the foil;

d) emitting pulsed laser radiation from the laser towards the foil;

wherein the laser and/or the foil positioning means is/are controlled such that pulsed laser radiation emitted by the laser towards the foil cuts through at least one layer of the foil, characterized in that the laser and/or the foil positioning means are controlled such that two consecutive pulses of the laser are not emitted onto a same area of the foil and at least two non-consecutive pulses of the laser are emitted onto the same area of the foil in a time interval which is greater than a pulse pause between two consecutive pulses.

The foil can consist of a single layer which comprises or consists of a metal (e.g. a foil consisting of lithium). Furthermore, the foil can comprise multiple layers, wherein at least one layer of the foil comprises or consists of a metal (e.g. the foil can have a layer consisting of a metal, such as lithium, in addition to a non-metallic layer).

The advantage of the method is that it reduces the melting of metal of the foil in the cutting region. Instead, the metal of the foil in the cutting region is mainly sublimated, i.e. it is substantially vaporized locally without melting itself and without heating metal in the environment so that it melts. This can be achieved by the specified procedure, in which a suitable selection of the intensity of the laser radiation acting on a specific area of the cutting edge at a specific time is advantageous. By means of the stated procedure, the energy input can be limited locally and the heat conduction with the associated increase in temperature above melting point can be reduced. The metal thus hardly melts but sublimates mainly at the target site of the laser radiation, i.e. selectively. Due to this type of material removal, the formation of bead structures and spatter structures of solidified metal (e.g. lithium) can be greatly reduced or completely avoided. Thus, by way of the method, a cut metal foil can be provided which is ideally suited for use as a battery component, as it reduces the risk of critical side reactions, dendrite formation and electrical short circuits and thus ensures greater long-term stability of the battery and fewer risks for the user.

The foil positioning means used in the method can be a means for positioning a foil via a contact to the foil or a means for a contactless positioning of a foil. The foil positioning means is preferably a means for holding and/or moving a foil. For example, the foil positioning means comprises or consists of a means selected from the group consisting of a support structure, conveyor belt, air cushion device and combinations thereof.

The method can be characterized in that the laser and/or foil positioning means are controlled, optionally by a control unit, such that at least five, more preferably at least ten, particularly preferably at least 20, most preferably at least 35, in particular at least 50, non-consecutive pulses of the laser are emitted onto the same area of foil in a time interval which is greater than a pulse pause between two consecutive pulses.

The time interval between two non-consecutive pulses on the same area of foil is preferably at least 10 ms, particularly preferably at least 25 ms.

Furthermore, the method can be characterized in that at least one, preferably all, parameters selected from the group consisting of pulse repetition rate of the laser, pulse duration of the laser, pulse spot size of the laser, pulse spot shape of the laser and relative movement between laser and foil positioning means, preferably the relative movement between laser and foil positioning means as a function of the other parameters, is/are set, optionally via a control unit, so that two consecutive pulses of the laser are not emitted onto the same area of foil.

In the method, optionally via a control unit, a pulse repetition rate of the laser radiation of the laser can be set according to the equation $f \leq (t_{Pulse} + d_{Pulse}/v)^{-1}$. Furthermore, optionally via a control unit, a pulse repetition rate of the laser radiation of the laser can be set in the range from 10 to 100 kHz, preferably in the range of 20 to 80 kHz, particularly preferably in the range from 40 to 60 kHz, in particular to 50 kHz. Here and in the following:

f: pulse repetition rate [Hz];

$t_{Pulse}$: pulse duration [s];

$d_{Pulse}$: diameter of the pulse spot [m];

V: relative movement between laser and foil positioning means [m/s].

Apart from this, in the method, optionally via a control unit, a pulse duration of the laser radiation of the laser can be set according to the equation $t_{Pulse} \leq 1/f - d_{Pulse}/v$. In addition, optionally via a control unit, a pulse duration of the laser radiation of the laser can be set in the range of 0.1 to 10 μs, preferably 0.2 to 8 μs, particularly preferably 0.3 to 6 μs, in particular 0.5 to 2 μs.

Furthermore, in the method, optionally via a control unit, a pulse spot diameter of the laser radiation of the laser can be set according to the equation $d_{Pulse} \leq (1/f - t_{Pulse}) \cdot v$. Furthermore, optionally via a control unit, a pulse spot diameter of the laser radiation of the laser can be set in the range of 10 to 100 μm, preferably 20 to 70 μm, particularly preferably 40 to 50 μm, in particular 45 μm. The pulse spot diameter is preferably defined as the spatially longest extension of the laser spot in a direction resulting from a relative movement between the laser and the foil. The pulse spot can have a round, oval or rectangular shape for example.

In addition, in the method, optionally via a control unit, a relative movement between the laser and the foil positioning means can be set according to the equation $v \geq d_{Pulse}/(1/f - t_{Pulse})$. Furthermore, optionally via a control unit, a relative movement between the laser and the foil positioning means can be set in a range from 2 to 15 m/s, preferably 3 to 12 m/s, particularly preferably 4 to 10 m/s.

The method can be characterized in that a relative movement between the laser and the foil positioning means is effectuated by controlling a movement of the laser and/or the foil positioning means, optionally controlled by a control unit. During transport of the foil via the foil positioning means to the laser, a foil can be cut from a roll. This can be a static cutting process (foil is unrolled from the roll and conveyed to the cutting area, is cut there in standing position and then transported away). Alternatively, this can be performed as an "on-the-fly" production process, i.e. as a continuous cutting process with a continuous material feed (cutting takes place during the continuous conveying of foil from the roll via the foil positioning means). Advantageously, the foil positioning means thus comprises a transport mechanism.

The foil used in the method can comprise or consist of one layer or multiple layers, which comprises or consists of a metal with a melting point in the region of ≤200° C., wherein the metal is preferably lithium. Furthermore, the foil used in the method can comprise or consist of one or more further layers, which comprises or consists of a material with a melting point in the region of >200° C., wherein the material is preferably selected from the group consisting of nickel, copper, stainless steel, carbon, silicon, polymer, ceramic and combinations thereof. In the method, optionally controlled by the control device, the further layer or the multiple further layers may or may not be cut through.

The laser used in the method may be a CW fiber laser which is operated in a pulsed mode, preferably in a "single-sector-pulsed" mode. Furthermore, it may be provided that the used laser used emits laser radiation with pulses in the form of a rectangular function. Furthermore, it may be provided that the laser emits laser radiation with a wavelength in the UV range, VIS range, NIR range or IR range, preferably laser radiation with a wavelength in the range of 400 nm to 1500 nm, in particular laser radiation with a wavelength of 1070 nm. Apart from this, it may be provided that the laser emits laser radiation with a radiation intensity in the range of $1 \cdot 10^7$ W/cm$^2$ to $1 \cdot 10^9$ W/cm$^2$. The laser used in the method may be an ytterbium-doped laser.

According to the invention, a device for is provided for cutting a foil which comprises or consists of at least one layer which comprises or consists of a metal, comprising
   a) a foil positioning means;
   b) a laser, which is configured to emit pulsed laser radiation towards a foil which is positioned by the foil positioning means and comprises or consists of at least one layer which comprises or consists of a metal (e.g. a foil consisting of lithium);
   c) a control unit which is connected communicatively to the laser and/or the foil positioning means;
wherein the control unit is configured to control the laser and/or the foil positioning means such that pulsed laser radiation, which is emitted by the laser towards a foil positioned by the foil positioning means, cuts through the at least one layer of the foil,
characterized in that the control unit is configured to control the laser and/or the foil positioning means such that two consecutive pulses of the laser are not emitted onto the same area of the foil and at least two non-consecutive pulses of the laser are emitted onto the same area of the foil in a time interval which is greater than a pulse pause between two consecutive pulses.

The advantage of the device is that it reduces the melting of metal of the foil in the cutting area. Instead, the metal of the foil in the cutting region is mainly sublimated, i.e. it is substantially vaporized locally without melting itself and without heating metal in the environment so that it melts. This can be achieved by the given configuration of the control unit of the device, wherein a suitable selection of the intensity of the laser radiation which acts at a specific time point on a specific area of the cutting edge is advantageous. By means of the given configuration of the control device, the input of energy can be limited locally and the heat conduction with the associated increase in temperature above melting point can be reduced. The metal thus barely melts, but mainly sublimates at the target site of the laser radiation, i.e. punctually. Due to this type of material removal, the formation of bead structures and spatter structures of solidified metal (e.g. lithium) can be greatly reduced or completely avoided. Thus, the device can provide a cut metal foil which is ideally suited for use as a battery component, as it reduces the risk of critical side reactions, dendrite formation and electrical short circuits, thus ensuring a greater long-term stability of the battery and reduced hazards for the user.

The foil positioning means of the device can be a means for positioning a foil via a contact to the foil or a means for a contactlessly positioning a foil. The foil positioning means is preferably a means for holding and/or moving a foil. For example, the foil positioning means comprises or consists of a means selected from the group consisting of support structure, conveyor belt, air cushion device and combinations thereof.

The device can be characterized in that the control device is configured to control the laser and/or the foil positioning means such that at least five, further preferably at least ten, particularly preferably at least 20, most preferably at least 35, in particular at least 50, non-consecutive pulses of the laser are emitted onto the same area of foil in a time interval which is greater than a pulse pause between two consecutive pulses. This embodiment is useful when thicker metal foils need to be cut. Since, in the case of thicker metal foils, a complete cut does not take place with two non-consecutive single pulses on the surface to be cut, the surface to be cut (cutting contour) is passed over multiple times in a certain time interval (number of passes) and more than two non-consecutive pulses are emitted onto the same surface of foil.

The time interval between two non-consecutive pulses on the same area of foil is preferably at least 10 ms, particularly preferably at least 25 ms. This time interval (delay) between the individual repetitions can ensure sufficient cooling of the metal (e.g. lithium) and thus avoid the local occurrence of melting processes. However, overall, despite the time interval between individual laser pulses on a specific area (spot) of the foil, a continuous cut in the foil can be given in a time interval of less than 1 second, wherein the duration depends of course on the total thickness of the foil and the edge length of the cut.

The control unit can be configured to set at least one, preferably all, parameters selected from the group consisting of pulse repetition rate of the laser, pulse duration of the laser, pulse spot size of the laser, pulse spot shape of the laser and relative movement between the laser and foil positioning means, preferably the relative movement between laser and foil positioning means as a function of the other parameters, so that two consecutive pulses of the laser are not emitted onto the same area of the foil.

Furthermore, the control unit can be configured to set a pulse repetition rate (pulse frequency) of the laser radiation of the laser according to the equation $f \leq (t_{Pulse} + d_{Pulse}/v)^{-1}$. In addition, the device can be configured to set a pulse repetition rate of the laser radiation of the laser in the range of 10 to 100 kHz, preferably in the range of 20 to 80 kHz, particularly preferably in the range of 40 to 60 kHz, in particular to 50 kHz. Here and in the following:
   f: pulse repetition rate [Hz];
   $t_{Puls}$: pulse duration [s];
   $d_{Puls}$: diameter of the pulse spot [m];
   V: relative movement between laser and foil positioning means [m/s].

Apart from this the control unit can be configured to set a pulse duration of the laser radiation of the laser according to the equation $t_{pulse} \leq 1/f - d_{Pulse}/v$. Furthermore, the control unit can be configured to set a pulse duration of the laser radiation of the laser in the range of 0.1 to 10 µs, preferably 0.2 to 8 µs, particularly preferably 0.3 to 6 µs, in particular 0.5 to 2 µs.

Furthermore, the control unit can be configured to set a pulse spot diameter of the laser radiation of the laser according to the equation $d_{Pulse} \leq (1/f - t_{Pulse}) \cdot v$. In addition, the control unit can be configured to set a pulse spot diameter of the laser radiation of the laser in the range of 10 to 100 μm, preferably 20 to 70 μm, particularly preferably 40 to 50 μm, in particular 45 μm. The pulse spot diameter is preferably defined as the spatially longest extension of the laser spot in a direction resulting from a relative movement between the laser and the foil. The pulse sport can have a round, oval or rectangular shape for example.

Furthermore, the control unit can be configured to set a relative movement between the laser and the foil positioning means according to the equation $v \geq d_{Pulse}/(1/f-t_{Pulse})$. In addition, the control unit can be configured to set a relative movement between the laser and the foil positioning means in a range of 2 to 15 m/s, preferably 3 to 12 m/s, particularly preferably 4 to 10 m/s.

The control unit can be configured to effectuate a relative movement between the laser and the foil positioning means by controlling a movement of the laser and/or the foil positioning means. Preferably, the foil positioning means comprises a transport mechanism. By means of this transport mechanism, a foil can be unrolled from a roll and conveyed to the laser. This is also possible on a continuous path so that the device is suitable for continuously cutting a foil.

On the means for positioning a foil of the device, a foil can be arranged which has at least one layer which comprises or consists of a metal. The foil preferably comprises one or more layers which comprise or consist of a metal with a melting point in the region of ≤200° C., the metal being preferably lithium. Furthermore, the foil can comprise or consist of one or more further layers which comprises or consists of material with a melting point in the region of >200° C., wherein the material is preferably selected from the group consisting of nickel, copper, stainless steel, carbon, silicon, polymer, ceramic and combinations thereof. The control unit of the device can also be configured to cut or not cut through the one or more further layers.

The laser of the device can be a CW fiber laser, which is preferably operated in a pulsed mode, preferably in a "single-sector-pulsed" mode. The laser can be configured to emit laser radiation with pulses in the form of a rectangular function. In addition, the laser can be configured to emit laser radiation with a wavelength in the UV range, VIS range, NIR range or IR range, preferably to emit laser radiation in the range of 400 nm to 1500 nm, in particular to emit laser radiation with a wavelength of 1070 nm. In a preferred embodiment the laser is configured to emit laser radiation with a radiation intensity in the range of $1 \cdot 10^7$ W/cm² to $1 \cdot 10^9$ W/cm². The laser can be an ytterbium-doped laser.

According to the invention, in addition a foil is provided which comprises or consists of a metal with a melting point of ≤200° C., preferably lithium, and has a top surface, a bottom surface and at least one laser-cut side surface, wherein the at least one side surface is separated from the top surface by a first cutting edge and is separated from the bottom surface by a second cutting edge. The foil is characterized in that i) the top surface, in a region at a distance of ≤100 μm, preferably ≤50 μm, particularly preferably ≤20 μm, from the first cutting edge, has no elevations relative to a planar surface of the top surface or has elevations with a height of only≤100 μm, preferably ≤50 μm, particularly preferably ≤20 μm, relative to a planar surface of the top surface; and/or ii) the bottom side surface, in a region at a distance of ≤100 μm, preferably ≤50 μm, particularly preferably ≤20 μm, from the second cutting edge, has no elevations relative to a planar surface of the lower side surface or has elevations with a height of only ≤100 μm, preferably ≤50 μm, particularly preferably ≤20 μm, relative to a planar surface of the upper side surface; and/or iii) the at least one side surface, in a region at a distance of ≤100 μm, preferably ≤50 μm, particularly preferably ≤20 μm from the first cutting edge, and/or in a region at a distance of ≤100 μm, preferably ≤50 μm, particularly preferably ≤20 μm, from the second cutting edge, has no elevations relative to a planar surface of the side surface, or has elevations with a height of only ≤100 μm, preferably ≤50 μm, particularly preferably ≤20 μm, relative to a planar surface of the side surface.

The foil can be characterized by the aforementioned features i) and ii). Furthermore, the foil can be characterized by features i) and iii) mentioned above. In addition, the foil can be characterized by features ii) and iii). Preferably, the foil is characterized by features i), ii) and iii).

The foil according to the invention has the advantage that it reduces the risk of critical side reactions, dendrite formation and electrical short circuits and thus ensures higher long-term stability of the battery and fewer hazards for the user.

The foil can be characterized in that its at least one side surface has a wave-like shape (or serrations) at least in some areas. This waveform can be formed in that the laser-cut side surfaces have been produced by two consecutive pulses of the laser which have not been emitted onto a same area of the foil and the laser spot has a circular diameter. In this case, adjacent cylinders with a circular base are removed (sublimated) from the foil which results in the waveform in the side surface. The waveform can be reduced or avoided if a laser spot with an oval (extended in feed direction) or square base is used, as in this case flush adjacent volume segments are removed (sublimated) from the foil.

Due to the sublimation of the metal at the cutting edge, the foil may have discolorations and plasma residues on its at least one side surface.

In a preferred embodiment, the foil according to the invention is produced by the method according to the invention.

The subject-matter of the invention is explained in more detail with reference to the following FIGURE.

The FIGURE shows a SEM image of a lithium foil which has been cut by the method or device according to the invention. The cut from the top surface 1 to the bottom surface 2 of the lithium foil has created a laser-cut side surface 3 in the lithium foil. The side surface 3 is separated from the top surface 1 by a first cutting edge (not shown in the FIGURE) and separated from the bottom surface 2 by a second cutting edge 4. In a region at a distance of ≤100 μm from the second cutting edge 4 the bottom surface 2 has practically no elevations compared to a planar surface of the bottom surface 2 (height of possible elevations ≤20 μm).

LIST OF REFERENCE SIGNS

1: top surface;
2: bottom surface;
3: side surface;
4: second cutting edge.

The invention claimed is:

1. A method for cutting a foil which comprises at least one layer which comprises a metal, comprising the steps of:
   a) providing a foil positioning means;
   b) positioning a foil which comprises at least one layer which comprises a metal by the foil positioning means;

c) providing a laser suitable for emitting pulsed laser radiation towards the foil; and d) emitting pulsed laser radiation from the laser towards the foil;

wherein the laser and/or the foil positioning means is/are controlled such that pulsed laser radiation emitted by the laser towards the foil cuts through the at least one layer of the foil, wherein the laser and/or the foil positioning means are controlled such that two consecutive pulses of the laser are not emitted onto a same area of the foil and at least two non-consecutive pulses of the laser are emitted onto the same area of the foil in a time interval which is greater than a pulse pause between two consecutive pulses.

2. The method according to claim 1, wherein the laser and/or the foil positioning means are controlled, optionally via a control unit, such that i) at least five non-consecutive pulses of the laser are emitted onto the same area of the foil in a time interval which is greater than a pulse pause between two consecutive pulses; and/or ii) the time interval between the at least two non-consecutive pulses of the laser onto the same area of foil is at least 10 ms.

3. The method according to claim 1, wherein i) a pulse repetition rate of the laser radiation of the laser is set according to the equation $f \leq (t_{Pulse} + d_{Pulse}/v)^{-1}$ and/or is set in the range of 10 to 100 kHz; and/or ii) a pulse duration of the laser radiation of the laser is set according to the equation $t_{Pulse} \leq 1/f - d_{Pulse}/v$ and/or is set in the range of 0.1 to 10 μs; and/or iii) a pulse spot diameter of the laser radiation of the laser is set according to the equation $d_{Pulse} \leq (1/f - t_{Pulse}) \cdot v$ and/or is set in the range of 10 to 100 μm; and/or iv) a relative movement between the laser and foil positioning means is set according to the equation $v \geq d_{Pulse}/(1/f - t_{Pulse})$ and/or is set in a range of 2 to 15 m/s;

wherein:

f: pulse repetition rate [Hz];

$t_{Pulse}$: pulse duration [s];

$d_{Pulse}$: diameter of the pulse spot [m]; and

V: relative movement between laser and foil positioning means [m/s].

4. The method according to claim 1, wherein a relative movement between the laser and the foil positioning means is effectuated by controlling a movement of the laser and/or the foil positioning means, optionally controlled via a control unit.

5. The method according to claim 1, wherein the foil i) comprises one or more layers which comprise a metal with a melting point of ≤200° C.; and/or ii) comprises one or more further layers comprising a material with a melting point of >200° C.

6. The method of claim 5, wherein the material is selected from the group consisting of nickel, copper, stainless steel, carbon, silicon, polymer, ceramic, and combinations thereof.

7. The method according to claim 1, wherein the laser i) is a CW fiber laser, which is operated in a pulsed mode; and/or ii) emits laser radiation with pulses in the form of a rectangle function; and/or iii) emits laser radiation with a wavelength in the UV range, VIS range, NIR range or IR range; and/or iv) emits laser radiation with a radiation intensity in the range of $1 \cdot 10^7$ W/cm$^2$ to $1 \cdot 10^9$ W/cm$^2$.

8. A device for cutting a foil which comprises at least one layer which comprises a metal, the device comprising a) a foil positioning means;

b) a laser which is configured to emit pulsed laser radiation towards a foil which is positioned by the foil positioning means and which comprises at least one layer which comprises a metal; and c) a control unit which is connected communicatively to the laser and/or the foil positioning means;

wherein the control unit is configured to control the laser and the foil positioning means or the foil positioning means such that pulsed laser radiation which is emitted by the laser towards a foil positioned by the foil positioning means cuts through the at least one layer of the foil, and wherein the control unit is configured to control the laser and/or the foil positioning means such that two consecutive pulses of the laser are not emitted onto the same area of the foil and at least two non-consecutive pulses of the laser are emitted onto the same area of the foil in a time interval which is greater than a pulse pause between two consecutive pulses.

9. The device according to claim 8, wherein the control unit is configured to control the laser and/or the foil positioning means such that i) at least five non-consecutive pulses of the laser are emitted onto the same area of foil in a time interval which is greater than a pulse pause between two consecutive pulses; and/or ii) the time interval between the at least two non-consecutive pulses of the laser onto the same area of foil is at least 10 ms.

10. The device according to claim 8, wherein the control unit is configured to set at least one parameter selected from the group consisting of pulse repetition rate of the laser, pulse duration of the laser, pulse spot size of the laser, pulse spot shape of the laser and relative movement between laser and foil positioning means, so that two consecutive pulses of the laser are not emitted onto a same area of foil.

11. The device according to claim 8, wherein the control unit is configured i) to set a pulse repetition rate of the laser radiation of the laser according to the equation $f \leq (t_{Pulse} + d_{Pulse}/v)^{-1}$ and/or in the range from 10 to 100 kHz; and/or ii) to set a pulse duration of the laser radiation of the laser according to the equation $t_{Pulse} \leq 1/f - d_{Pulse}/v$ and/or in the range of 0.1 to 10 μs; and/or iii) to set a pulse spot diameter of the laser radiation of the laser according to the equation $d_{Pulse} \leq (1/f - t_{Pulse}) \cdot v$ and/or in the range of 10 to 100 μm; and/or iv) to set a relative movement between the laser and the foil positioning means according to the equation $v \geq d_{Pulse}/(1/f - t_{Pulse})$ and/or in a range of 2 to 15 m/s;

wherein:

f: pulse repetition rate [Hz];

$t_{Puls}$: pulse duration [s];

$d_{Puls}$: diameter of the pulse spot [m]; and

V: relative movement between laser and foil positioning means [m/s].

12. The device according to claim 8, wherein the control unit is configured to effectuate a relative movement between the laser and the foil positioning means by controlling a movement of the laser and/or the foil positioning means.

13. The device according to claim 8, wherein a foil that has at least one layer which comprises a metal is arranged on the foil positioning means.

14. The device according to claim 13, wherein the foil i) comprises a metal with a melting point of ≤200° C.; and/or ii) comprises one or more further layers which comprises a material with a melting point of >200° C.

15. The device according to claim 8, wherein the laser i) is a CW fiber laser, which is operated in a pulsed mode; and/or is configured to emit laser radiation with pulses in the form of a 11 rectangle function; and/or iii) is configured to emit laser radiation with a wavelength in the UV range, VIS range, NIR range or IR range; and/or iv) is configured to emit laser radiation with a radiation intensity in the range of $1 \cdot 10^7$ W/cm$^2$ to $1 \cdot 10^9$ W/cm$^2$.

*   *   *   *   *